United States Patent [19]

Stein

[11] 4,389,729

[45] Jun. 21, 1983

[54] HIGH RESOLUTION DIGITAL RADIOGRAPHY SYSTEM

[75] Inventor: Jay Stein, Framingham, Mass.

[73] Assignee: American Science and Engineering, Inc., Cambridge, Mass.

[21] Appl. No.: 331,100

[22] Filed: Dec. 15, 1981

[51] Int. Cl.³ ........................ G01N 23/04; H05G 1/60

[52] U.S. Cl. ........................ 378/99; 358/111; 378/149

[58] Field of Search ........................ 378/99, 146, 149; 358/111

[56] References Cited

U.S. PATENT DOCUMENTS 2,730,566 1/1956 Bartow et al. ........................ 358/111

FOREIGN PATENT DOCUMENTS 1372722 8/1964 France ........................ 378/149

*Primary Examiner*—Alfred E. Smith
*Assistant Examiner*—T. N. Grigsby
*Attorney, Agent, or Firm*—Pollock, Vande Sande & Priddy

[57] ABSTRACT

A digital radiography system includes an X-ray source for projecting a beam of X-rays toward and through an object to be examined onto the input face of an image intensifier tube. A multi-hole collimator is disposed between the object and the image intensifier tube for producing a two-dimensional array of spaced pencil beams, and these pencil beams are raster scanned relative to the object being examined and across the input face of the image intensifier tube through small distances corresponding generally to the distance between the holes in the collimator. The succession of images which are produced on the output face of the image intensifier tube during the scanning of the pencil beams are scanned by a video camera whose output signals are digitized and stored as partial images, and the partial images are thereafter interleaved with one another to provide a composite comparatively high resolution image of the object being examined.

14 Claims, 2 Drawing Figures

HIGH RESOLUTION DIGITAL RADIOGRAPHY SYSTEM

BACKGROUND OF THE INVENTION

The present invention relates to a digital radiography system which provides a significant advance in X-ray imaging technology used for nondestructive evaluation, and is more particularly concerned with a system which will provide X-ray images having a spatial resolution and contrast resolution comparable to conventional X-ray film techniques without requiring the use of film. The system utilizes for this purpose substantially conventional, low resolution fluoroscopic equipment which, however, is modified to incorporate a specially designed multi-hole collimator plate therein, as well as digital image processing techniques.

Various methods and apparatuses have been suggested heretofore for use in examining an object by means of X-rays. One known apparatus used for this purpose is so-called fluoroscopic equipment employing an image intensifier tube which includes a thin photocathode that reacts to radiation passing through an object being examined to form an electron image which, in turn, is projected onto an output phosphor screen by means of magnetic or electrostatic focusing lenses to produce an optically visible image that can be observed directly on the output screen of the image intensifier, or which can be monitored by a video system to produce the image on a CRT display that is located in spaced relation to the image intensifier tube. Such a system has the advantage that an image of the object being examined can be obtained at low radiation dosages and in real time without the use of X-ray film. However such systems suffer the disadvantage that the image which is produced has comparatively low resolution, i.e., in the case of a conventional nine inch image intensifier system coupled to a standard 512 line TV camera, the limiting resolution which is typically obtained is substantially one line pair per millimeter (lp/mm). Such images, while useful for some purposes, have limited utility; and when it is desired to obtain a higher resolution image, the art has heretofore considered it necessary to resort to the use of X-ray film with the attendant disadvantages that such film present, i.e., cost, requirement for processing the film, etc.

The present invention obviates these problems by providing a system wherein high spatial resolution digital X-ray images can be obtained using low resolution fluoroscopic equipment, correctly modified, thereby dispensing with the need for film to obtain high resolution images. The system of the present invention can, if desired, retrofit existing conventional X-ray fluoroscopic systems and/or can be combined with existing low resolution equipment in such manner that, in one mode of operation, the equipment can be operated in conventional fluoroscopic fashion for localization purposes, i.e., to orient a test object in real time thereby to best discern a defect or to choose an optimum KV setting for the object, whereafter the equipment can be operated in a different mode to obtain a high resolution video display of the object being examined.

SUMMARY OF THE INVENTION

In accordance with the present invention, a substantially conventional low-resolution fluoroscopic system comprising an X-ray source, an image intensifier tube, and an associated video system is modified to incorporate a multi-hole collimator disposed between the X-ray source and input face of the image intensifier tube, preferably between the object being examined and said input face of the image intensifier, whereby the X-rays striking the input face of the image intensifier tube take the form of a large plurality of pencil beams. The object being examined is raster scanned by these pencil beams, e.g., by moving the object in X-Y directions relative to the multi-hole collimator, through small distances corresponding roughly to the distance between the collimator holes. In effect, therefore, the system employing the multi-hole collimator can be viewed as a series of hundreds of scanning beam imaging systems rather than a simple fluoroscopic system, and operates, with the multi-hole collimator used in its scanning mode, to produce a plurality of "partial" images successively on the output face of the image intensifier tube.

The images appearing on the output face of the image intensifier are raster scanned by a video camera to produce analog signals which are digitized. As the object is raster scanned over an area of, for example, 2 mm×2 mm in increments of 0.2 mm, as many as 100 such partial images can be acquired over a period of time, say fives minutes. The signals representative of the partial images may consist of as many as 100 television frames that are digitized, integrated and stored as one partial image. The partial images are interleaved with one another to produce a composite high resolution final image which has been assembled from the separated partial digital images acquired and stored during the scan.

When the multi-hole collimator is used in a scanning mode, the spatial resolution is determined by the physical size of the holes in the collimator, and not by any of the characteristics of the image intensifier or of the associated television system, as is the case with conventional systems. Moreover, in addition to provide a capability for achieving high spatial resolution without the use of film, the multi-hole collimator employed in the present invention plays an important role in eliminating scattered radiation, i.e., it serves as a "grid" that eliminates most of the scattered radiation which would otherwise strike the fluoroscope face plate.

BRIEF DESCRIPTION OF THE DRAWINGS

The foregoing objects, advantages, construction and operation of the present invention will become more readily apparent from the following description and accompanying drawings wherein.

DESCRIPTION OF THE PREFERRED EMBODIMENTS

Figure 1:
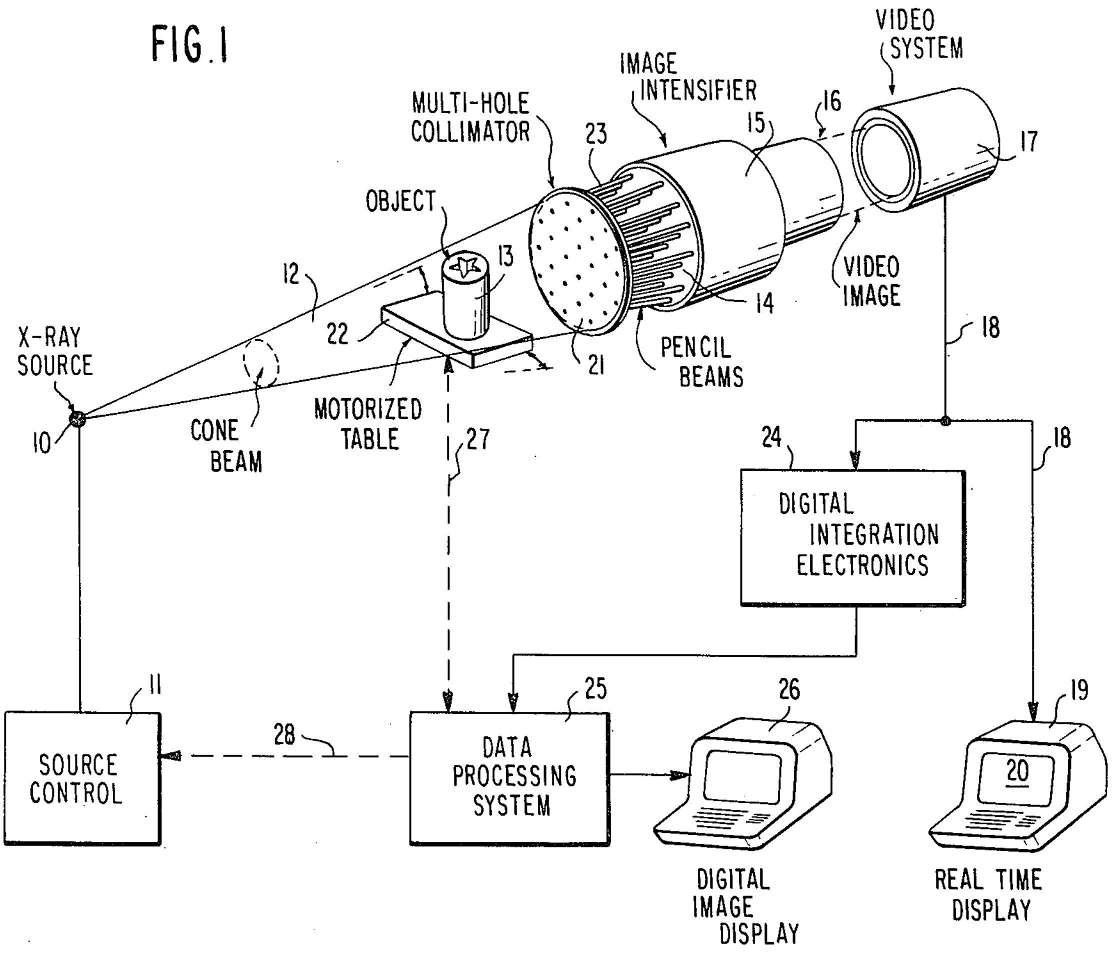
FIG. 1 depicts a high resolution digital radiography system constructed in accordance with the present invention.

Referring to FIG. 1, it will be seen that a system constructed in accordance with the present invention comprises an X-ray source 10 that is associated with an appropriate control circuit 11 which functions to turn source 10 on and off and, if desired, controls the intensity of the source. Source 10 functions to produce a conical beam 12 of X-rays which are projected through and past an object 13 whose opacity and/or internal structure is to be examined, and the X-rays passing through said object 13 impinge on the forward or input face 14 of an image intensifier tube 15 to produce an image on the rear or output face 16 of image intensifier 15. The image appearing on face 16 can be viewed directly or, if desired, it may be scanned by a video system 17 comprising, for example, a video camera tube to produce analog signals at output 18 which are coupled to a real time display 19 so that said image may be viewed at a remote location on the screen 20 of display 19. The image intensifier fluoroscopic system thus described, and the associated video chain, are conventional devices and (in the absence of the present invention to be described) operate to produce an image at 16 or 20 which is of comparatively poor quality, and whose spatial resolution is limited and determined by the characteristics of image intensifier tube 15 and the video system 17. Typically, when the intensifier system is a conventional 9-inch tube and is coupled to a standard 512 line TV camera, the limiting resolution is approximately 1 lp/mm.

In accordance with the present invention, the system described above is modified to incorporate a specially-designed multi-hole collimator plate 21, preferably located between object 13 and input face 14 of image intensifier tube 15, and a motorized table 22 which supports object 13 for examination and which is operative to move said object in XY directions thereby to effect a raster scan of pencil beams 23 that emerge from collimator plate 21 toward input face 14 of tube 15. The XY motions are actually in preferred form intended to be rotations of the object through small arcs about the position of the X-ray focal spot 10. Digital integration electronic circuits 24 receive the analog signals on line 18 and function in the manner to be described to supply digital signals to a data processing system 25; and a digital image display 26 produces a final high resolution image. While displays 19 and 26 are illustrated as two separate displays, it will be apparent to those skilled in the art that only a single display facility need be provided with an appropriate switching arrangement being utilized to connect said display to line 18 when a real-time comparatively low resolution image is to be displayed, or to the output of data processing system 25 when the higher resolution digital display achieved by the present invention is to be effected. Alternatively, both displays 19 and 26 can be provided so that, as will be described, a real time analog signal image can be displayed on screen 20 at the same time that a composite digital signal is being built up to produce a digital signal image on display 26.

The added units described above do not require any change to the conventional image intensifier fluoroscopic system and, indeed, can be used to retrofit existing conventional X-ray fluoroscopic systems thereby to achieve high spatial resolution even when used with existing low resolution equipment. Moreover, as will be apparent to those skilled in the art, the multi-hole collimator 21 can be so mounted that it can be positioned as shown in FIG. 1 or, alternatively, displaced out of the path of X-rays emanating from source 10 through object 13 toward face 14 whereby, in this latter mode, the system operates in entirely conventional fluoroscopic fashion to produce a real-time comparatively low resolution image on screen 20 to orient test object 13 in real time thereby to best discern or localize a defect, or to choose an optinum KV setting for the object, whereafter the higher resolution image is produced by moving collimator 21 back into place.

In a typical example of the present invention, the X-ray fluoroscope is a 9-inch diameter image intensifer, and the multi-hole collimator 21 contains about 10,000 holes each fo dimension 0.2 mm×0.2 mm and located on 2 mm centers. The total open area represented by the holes in collimator plate 31 thus consists of about 1 percent of the area of the face plate 14 on image intensifier tube 15. The multi-hole collimator, when in place, produces an array of pencil beans 23 which impinge on face plate 14 of tube 15, and which are raster scanned respectively relative to object 13 over small distances respectively, corresponding roughly to the distance between the collimator holes. More particularly, for the hole dimensions and spacing described, each of pencil beams 23 has dimensions of substantially 0.2 mm×0.2 mm, and said beam raster scans the object 13 over an area of 2 mm×2 mm in increments of 0.2 mm. This scanning over the short interhole distances is most conveniently achieved by scanning object 13 itself, rather than moving the imaging system. More particularly, the scanning of the pencil beams relative to object 13 can be accomplished by arranging object 13 on the aforementioned motorized table 22, comprising a specially-designed stage that undergoes an XY type of motion. The X and Y increments of motion are actually rotations of the object through small arcs about the position of the X-ray focal spot at source 10.

As the pencil beams scan their respective small areas on face plate 14 of image intensifier tube 15, the face 14 of tube 15 acts as a detector to provide information regarding the X-ray opacity of the particular regions of object 13 which are being traversed by the individual pencil beams. In contrast to prior systems where discrete detectors may have been used for each beam of a multi-beam system, however, the face plate 14 of tube 15 is not a discrete detector for each beam respectively and, instead, the actual region of the face plate which acts as a detector for each pencil beam of X-rays is determined by the dimensions of the holes in the collimator 21 rather than by the dimensions of the detector itself. Although the collimator may be used also with a system of discrete detectors, an advantage of using nondiscrete detectors is the absence of problems which occur at the interface between detectors which may cause lines in the final image.

As the object is raster scanned by the X-ray pencil beams over the limited areas referred to above, multiple television frames are integrated by electronics 24 and stored in data processing system 25 as partial images. More particularly, for each incremental position of the X-ray pencil beam scan, the video system 17 scans the spaced points that are produced in the image on output face 16 of image intensifier tube 15 (see FIG. 2), and the digital integration electronics 24 digitizes, point by point, the analog information which is detected on each line of the television scan and, optionally, adds together information in successive frames of the scan. This adding together of information in successive frames improves the signal to noise ratio of the final image and is in itself a known technique. The information which is derived by digital integration electronics 24 is temporarily stored at 24 and then transferred to data processing system 25. The information which is supplied to data processing system 25 consists of a series of integrated images, each of which corresponds to one position of the object 13 as it is being moved by motorized table 22, and each of these integrated images has comparatively low resolution. Data processing system 25 operates to interleave this series of comparatively low resolution images so that they are combined into a single high resolution image. All the information which appears in the partial images appears as well in the final image, so that the final image which appears on digital image display 26 is, in effect, a composite of all of the partial images, but different points in a given partial image appear at more widely spaced locations in the final image with the invervening points in said final image being derived, in turn, from others of the partial images.

Referring more particularly to the example given above, wherein the object is raster scanned over an area of 2 mm×2 mm in increments of 0.2 mm, at each increment as many as 100 multiple television frames are integrated by circuit 24 and stored in data processing system 25 as one partial image. The raster scan consisting of the 10×10 matrix of increments is used to acquire a complete set of 100 partial images in a period of five minutes. The resultant final image is assembled in data processing system 25 from the 100 separate partial digital images acquired and stored during the raster scan. For example, a given line in the final image may contain points 1, 21, 31, etc. from partial image 1, points 2, 22, 32, etc., from partial image 2, etc. The limiting spatial resolution of the final image in this particular example will be 5 lp/mm, which is significantly higher than the limiting resolution of 1 lp/mm typically obtained with a conventional intensifier system of the type previously described.

In effect, with collimator 21 in place, and with the object being raster scanned over the small distance corresponding roughly to the distance between collimator holes, the system can be viewed as a series of hundreds of scanning beam imaging systems rather than as a simple fluoroscopic system. To achieve scanning with the collimator in place, an adjustment is made to allow for the reduced radiation flux striking the input screen of the image intensifier 15. With the multi-hole collimator in place and used in its scanning mode, the spatial resolution of the system is determined by the physical size of the holes in the collimator, and not by any of the characteristics of the fluoroscent screen or television system as in conventional fluoroscopic systems. In addition to providing a capability for achieving high spatial resolution without the use of film, the multi-hole collimator 21 plans an important role in eliminating scattered radiation, i.e., it serves as a grid which eliminates most of the scattered radiation that would otherwise strike the fluoroscope face plate 14.

Figure 2:
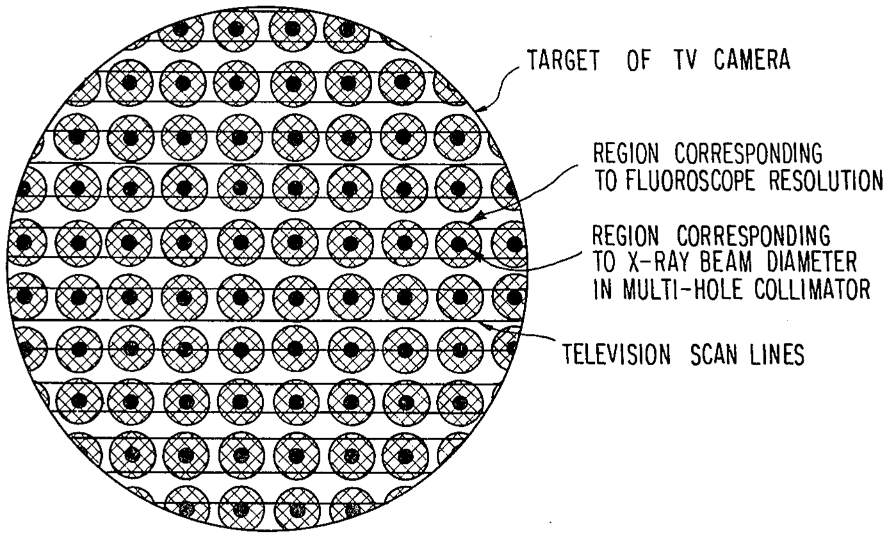
FIG. 2 diagrammatically shows the relationship between the television scan lines, the resolution of the fluoroscopic system, and the X-ray beam diameter formed by the multi-hole collimator.

FIG. 2 diagrammatically shows the relationship between the television scan lines, the resolution of the fluoroscopic system, and the X-ray beam diameter formed by the multi-hole collimator 21. The main feature of the system is its ability to use the low resolution television system to record series of partial X-ray images which are then combined to form one high resolution total image. Indeed, the system has the capability of providing X-ray images that exhibit a spatial resolution and contrast resolution superior to that achievable by conventional X-ray film techniques, and does so without requiring the use of film. The improvement in spatial resolution achieved by the system is, moreover, and as has already been mentioned, accompanied by large improvements in contrast resolution that are achieved by digital integration and high scatter rejection.

The system is designed to be adapted by any conventional type of fluoroscopic system and can be used for radiography at energies from 10 Kev to 15 Mev. Spatial resolutions as high as 20 lp/mm can be achieved, at least at the lower energies in said range, simultaneously with very high contrast resolution. The reduction in radiation intensity striking the intensifier face plate requires that the intensifier be operated at a higher electronic or optical gain than in a conventional system, e.g., a higher voltage is applied to the intensifier face plate and/or a larger aperture setting is used in the aperture between the output side of the image intensifier 15 and the face of the video camera in system 17. With this constraint, the multi-hole collimator digital radiography system of the present invention can achieve a high spatial resolution of, for example, 20 lp/mm or higher; a high contrast resolution (1 percent or better); and high scatter rejection (greater than 90 percent), and achieves these results without the use of X-ray film and without detracting from the possibility of using the system in its conventional fluoroscopic mode.

If the collimator disc 21 has any significant thickness, the various holes in that disc must be differently oriented so that each hole is aligned toward X-ray source 10. This is not necessary, however, if the collimator disc is very thin. The collimator disc 21 can be either planar faced or spherically faced. The use of a planar faced disc simplifies the construction of collimator 21, but complicates somewhat the data meshing in data processing system 25. The use of a spherically faced disc complicates somewhat the construction of the disc itself, but simplifies the data meshing at the data processor. Also, the holes in the collimator disc 21 can be variably spaced in the planar faced disc arrangement to simplify the processing of the data which is derived by use of that disc with, however, the disadvantage that the collimator disc 21 becomes somewhat more complex to construct.

The operation of data processing system 25 can be implemented by simple algorithms which function to store the digital information supplied by circuit 24 and which interleave the various partial images in accordance with the techniques described above. The scanning motion which is achieved by movement of table 22 must be coordinated with the information which is being digitized and supplied by circuit 24, i.e., whatever drive source is coupled to the table 22 should also supply positional information to data processing system 25, e.g., as represented by line 27, to define the instantaneous position of the table 22. In a preferred embodiment of the invention, moreover, data processing system 25 is coupled to source control 11, e.g., as represented by line 28, as well as to motorized table 22 (line 27) so that the data processing system functions to turn on X-ray source 10 and also to initiate motion of the motorized table 22.

While I have thus described preferred embodiments of the present invention, many variations will be apparent to those skilled in the art. For example, while the foregoing description refers to the use of X-rays, other radiant energy sources could be employed and are intended to fall within the term "X-rays" used in the appended claims. Other variations will be apparent to those skilled in the art, and it must therefore be understood that the foregoing description is intended to be illustrative only and not limitative of the present invention.

Having thus described my invention, I claim:

1. A digital radiography system comprising means for supporting an object to be examined, an X-ray source disposed on one side of said supporting means for generating X-rays which pass through said object, an image intensifier located on the other side of said object, said image intensifer hving an input face positioned to intercept X-rays passing through said object and an output face responsive to the X-rays intercepted by said input face for producing a visual image containing information as to the X-ray opacity of different regions of said object, collimator means located between said object and said input face of said image intensifier for converting the X-rays passing through said object into a plurality of pencil beams of X-rays which are incident on said input face, means for scanning said pencil beams across said object through small distances, respectively, corresponding substantially to the distances between adjacent ones of said beams, video means for raster scanning the visual images which are produced on said output face of said image intensifier as said pencil beams of X-rays are scanned relative to said input face, means for digitizing the information which is detected by said video means during the scanning of said pencil beams to provide digital signals representative of a succession of comparatively low resolution images of the object being examined, means for combining said comparatively low resolution image signals to provide a composite signal representative of a comparatively high resolution image of said object, and display means responsive to said composite signal for displaying said high resolution image.

2. The digital radiography system of claim 1 wherein said collimator means comprises an X-ray opaque plate having an array of spaced X-ray transparent apertures therein, the total area of said apertures being a small fraction of the area of said input face of said image intensifier.

3. The digital radiography system of claim 2 wherein said scanning means is operative to raster scan each of said pencil beams over a restricted region of said input face substantially equal in one direction to the spacing in said one direction between adjacent ones of said apertures and substantially equal, in a second direction transverse to said first direction, to the spacing between adjacent ones of said apertures in said second direction.

4. The digital radiography system of claim 1 wherein said scanning means comprises means for moving the object being examined in X-Y directions relative to said X-ray source.

5. The digital radiography system of claim 4 wherein said scanning means comprises means for rotating said object supporting means through small arcs centered about the position of the X-ray focal spot of said X-ray source.

6. A digital radiography system comprising means for supporting an object to be examined, an X-ray source disposed adjacent one side of said object for projecting a conical beam of X-rays toward said object, collimator means adjacent said object for reconfiguring said X-rays into a plurality of simultaneously occurring pencil beams which are disposed in an array having a width at least as great as the width of said object and a height at least as great as the height of said object, detector means comprising a unitary detector surface adapted to intercept all of said pencil beams simultaneously, means for effecting a two-dimensional scan of each of said pencil beams relative to said object and over a limited two-dimensional region of said detector surface that is associated respectively with each said pencil beam, means responsive to the output of said detector means for producing a succession of analog signals, means for digitizing said analog signals to produce groups of digital signals that are representative respectively of successive low resolution images of said object, means for integrating said groups of digital signals to produce a composite digital signal representative of a high resolution image of said object, and display means responsive to said composite digital signal for providing a visual display of said high resolution image.

7. The digital radiography system of claim 6 wherein said collimator means is located between said object and said detector surface.

8. The digital radiography system of claim 6 wherein said detector surface comprises the face plate of an image intensifier tube, said tube also having an output face operative to produce a visual image in response to the interception of X-rays by said face plate, said means for producing a succession of analog signals comprising video means for scanning the visual image appearing on the output face of said tube.

9. The digital radiography system of claim 6 wherein said collimator means comprises a stationary X-ray opaque plate having a two-dimensional array of X-ray transparent apertures extending therethrough, each of said apertures being aligned with the X-ray focal spot of said X-ray source.

10. The digital radiography system of claim 9 wherein each of said apertures has a dimension of substantially 0.2 mm×0.2 mm, said apertures being located on centers of substantially 2 mm.

11. The digital radiography system of claim 6 wherein said means for effecting a two-dimensional scan of each of said pencil beams comprises means for effecting an X-Y motion of the object to be scanned.

12. In a fluoroscopic system of the type comprising an X-ray source located on one side of an object to be examined, an image intensifier tube located on the other side of said object, and a video system for scanning an image generated on an output face of said tube for producing analog signals representative of said image, the improvement comprising collimator means located between said X-ray source and said image intensifier tube, said collimator means having a two-dimensional array of spaced holes therein for directing a corresponding array of pencil beams of X-rays toward the input face of the image intensifier tube, means for raster scanning said pencil beams relative to said object and across said input face through distances substantially corresponding to the distances between the spaced holes in said collimator means while said video system is scanning the images that are generated on the output face of said tube, means for digitizing the analog signals produced by said video system, and means for interleaving a series of said digitized signals to provide a composite digital signal representative of a high resolution image of said object.

13. The system of claim 12 wherein said collimator means is located between said object and the input face of said image intensifier tube.

14. The system of claim 12 wherein said collimator means is adapted to be moved between a first position located between said X-ray source and tube and a second position that is displaced from said first position, said system including image display means for producing both a digital signal visual image and a real time analog signal image of said object when said collimator is in said first position, and responsive to said analog signals for producing only a real time analog signal image of said object when said collimator is in said second position.

* * * * *